(12) United States Patent
Doehrn et al.

(10) Patent No.: US 10,970,272 B2
(45) Date of Patent: Apr. 6, 2021

(54) DATA CLOUD—PLATFORM FOR DATA ENRICHMENT

(71) Applicant: SAP SE, Walldorf (DE)

(72) Inventors: Andreas Doehrn, Heidelberg (DE); Rathnakumar G, Bangalore (IN); Gurinder Bahl, Hayward, CA (US); Aaby Sivakumar, Kollam (IN); Raghavendra Deshpande, Bangalore (IN); Anil Kumar R, Bangalore (IN); Prakash Ponshankaarchinnusamy, Tiruchengode (IN); Kefeng Wang, Wiesloch (DE); Hartmut Vogler, San Mateo, CA (US); Rashmi RK, Bangalore (IN); Priyanka Gupta, Asansol (IN); Sonali Jha, Kharagpur (IN); Mamatha M. Raj, Bangalore (IN); Kumar Rishav, Dhanbad (IN); Thakur Nishant Singh, Bhabua (IN)

(73) Assignee: SAP SE, Walldorf (DE)

( * ) Notice: Subject to any disclaimer, the term of this patent is extended or adjusted under 35 U.S.C. 154(b) by 254 days.

(21) Appl. No.: 16/263,255

(22) Filed: Jan. 31, 2019

(65) Prior Publication Data
US 2020/0250170 A1   Aug. 6, 2020

(51) Int. Cl.
*G06F 16/23* (2019.01)
*G06F 16/2455* (2019.01)
*G06Q 30/08* (2012.01)
*G06F 16/18* (2019.01)

(52) U.S. Cl.
CPC ...... *G06F 16/2365* (2019.01); *G06F 16/1865* (2019.01); *G06F 16/24556* (2019.01); *G06Q 30/08* (2013.01); *G06Q 2220/12* (2013.01)

(58) Field of Classification Search
USPC ............... 707/690, 687, 706, 717, 803, 805
See application file for complete search history.

(56) References Cited

U.S. PATENT DOCUMENTS

| | | | |
|---|---|---|---|
| 7,882,088 B2 | 2/2011 | Veit | |
| 9,122,720 B2 | 9/2015 | Bice et al. | |
| 9,971,469 B2 | 5/2018 | Pacalin et al. | |
| 9,971,803 B2 | 5/2018 | Rehman et al. | |
| 2005/0278458 A1* | 12/2005 | Berger | H04L 67/1097 709/248 |

(Continued)

*Primary Examiner* — Cam Linh T Nguyen
(74) *Attorney, Agent, or Firm* — Schwegman Lundberg & Woessner, P.A.

(57) ABSTRACT

A method of enhancing one or more fields of a master database record based on a consumption of one or more data points provided via a third-party data subscription service is disclosed. An aggregated view corresponding to a master database record is accessed. The aggregated view identifies correspondences between the one or more fields of the master database record and the one or more data points provided via the third-party data subscription service. Based on a determination that one or more consumption criteria are met, the one or more data points are consumed and stored in a central database. The one or more fields of the master database record are updated based on the one or more consumed data points. The enhanced master database record is provided via a network to one or more computerized processes associated with one or more consumers of the enhanced master database record.

20 Claims, 11 Drawing Sheets

(56) References Cited

U.S. PATENT DOCUMENTS

| | | | |
|---|---|---|---|
| 2006/0161635 A1* | 7/2006 | Lamkin | G06F 16/4387 |
| | | | 709/217 |
| 2010/0088669 A1* | 4/2010 | Cwalina | G06F 8/73 |
| | | | 717/106 |
| 2012/0004893 A1* | 1/2012 | Vaidyanathan | G06K 9/00147 |
| | | | 703/11 |
| 2014/0156344 A1* | 6/2014 | D'Cruz | G06Q 10/063 |
| | | | 705/7.29 |
| 2014/0337475 A1* | 11/2014 | Tolany | H04N 21/2665 |
| | | | 709/218 |
| 2015/0026260 A1* | 1/2015 | Worthley | G06F 16/958 |
| | | | 709/204 |
| 2015/0317572 A1 | 11/2015 | Balasubramanian | |
| 2016/0171020 A1* | 6/2016 | Stork | G06F 16/2282 |
| | | | 707/803 |
| 2016/0301706 A1* | 10/2016 | Katz | H04L 63/1408 |
| 2017/0061007 A1 | 3/2017 | Ezzat et al. | |
| 2019/0220464 A1* | 7/2019 | Butani | G06F 16/2455 |
| 2020/0192891 A1* | 6/2020 | Hrastnik | G06F 16/24539 |

\* cited by examiner

BPVIEWTEMPLATE

VIEW ⌄    EDIT HEADER    DELETE

DESCRIPTION: BP TEMPLATE - DO NOT DELETE    MATCH THRESHOLD: VERY FUZZY (60%)
DOMAIN: BUSINESS PARTNER (BP)

DATA POINT

ADD    EDIT    DELETE

| ☐ | DATA POINT | DATA PROVIDER | PRODUCT |
|---|---|---|---|
| ☐ | MAILING ADDRESS<br>ADDRESS.MAILINGADDRESS | DUN & BRADSTREET (DNBAPI) | SAP-CORE (SKU1) |
| ☐ | STANDARD ADDRESS<br>ADDRESS.STANDARDADDRESS | DUN & BRADSTREET (DNBAPI) | SAP-CORE (SKU1) |
| ☐ | BUSINESS PARTNER<br>BUSINESSPARTNER | DUN & BRADSTREET (DNBAPI) | SAP-CORE (SKU1) |
| ☐ | INDUSTRY SECTOR<br>INDUSTRY SECTOR | DUN & BRADSTREET (DNBAPI) | SAP-CORE (SKU1) |
| ☐ | TRADE STYLE<br>TRADE SYLE | DUN & BRADSTREET (DNBAPI) | SAP-CORE (SKU1) |

NESTLE USA, NC. 1950

ORGANIZATION STATUS: SUBSIDIARY    STANDARD ADDRESS    CONTACT
                                   : 1812 N MOORE ST   : 8185496000
                                   ARLINGTON            8185495824
                                   VIRGINIA
                                   UNITED STATES
                                   222091815

BASIC DATA ∨    BUSINESS DATA ∨    ADDRESS ∨    HIERARCHY ∨

GENERAL INFORMATION

BUSINESS PARTNER NAME:       NATIONAL ID NUMBER:                                              WEBSITE ADDRESS DOMAIN:
NESTLE USE, INC.             95-1572209                                                       NESTLEJOBS.COM

PROVIDER ID:                 NATIONAL ID TYPE:                                                WEBSITE ADDRESS URL:
008256224 (D-U-N-S)          FEDERAL TAXPAYER IDENTIFICATION NUMBER (US) (6863)               WWW.NESTLEJOBS.COM

BUSINESS PARTNER ID:         SUBSIDIARY INDICATOR:
1950

PREVIOUS ID:                 FAMILY TREE HIERARCHY LEVEL CODE:
                             3

LEGAL STATUS                 REGISTERED ADDRESS ID:
CORPORATION (451)            FALSE

*FIG. 9*

DUN & BRADSTREET  SAP-CORE

CONSUMPTION DETAILS ˅

CONSUMED RECORDS: 223

ALL RECORDS (223)

| BUSINESS PARTNER ID | VIEW | PROVIDER ID | ACCESSED DATE |
|---|---|---|---|
| ○ 2709 | BPVIEWTEMPLATE | 080135324 (D-U-N-S) | MAY 18, 2018 |
| ○ 7 | BPVIEWTEMPLATE | 313452634 (D-U-N-S) | MAY 18, 2018 |
| ○ 54 | BPVIEWTEMPLATE | 342555134 (D-U-N-S) | MAY 18, 2018 |
| ○ 55 | BPVIEWTEMPLATE | 342555135 (D-U-N-S) | MAY 18, 2018 |
| ○ 921 | BPVIEWTEMPLATE | 624242293 (D-U-N-S) | MAY 18, 2018 |
| ○ 200 | BPVIEWTEMPLATE | 080337067 (D-U-N-S) | MAY 17, 2018 |
| ○ 202 | BPVIEWTEMPLATE | 080384938 (D-U-N-S) | MAY 17, 2018 |

*FIG. 10*

DATA CLOUD—PLATFORM FOR DATA ENRICHMENT

TECHNICAL FIELD

The present disclosure generally relates to population of data records in a database management system and, in one specific example, to automatic enrichment of database records stored in a database management system using data items accessed from one or more separate systems, such as one or more external systems that are identified as reliable sources with respect to types of the data items.

BACKGROUND

Data intelligence solutions may connect, aggregate, and anonymize data to prepare it for commercial consumption. For example, business entities may apply algorithms to its data and create data insights, services, or data-driven applications for its businesses and its customers. The business entities may then supplement their own data items with customer, partner, or third-party industry data items. Revenue streams created and associated with such data intelligence solutions may be called Data-as-a-Service (DaaS) revenue streams.

There are various technical problems associated with implementing such data intelligence solutions. Such technical problems may relate to, for example, accessibility (e.g., knowing whether or not specific data items exist or not knowing how to access existing data items), actionality (e.g., finding data, but discovering it is unformatted, outdated, or cannot be extracted), and sharing (e.g., needing to know what datasets a business entities owns and how to centrally share these datasets across lines of business).

BRIEF DESCRIPTION OF THE DRAWINGS

FIG. 7 is a screenshot of an example user interface for creating or editing an aggregated view.

FIG. 8 is screenshot of an example user interface for querying one or more master data sets.

FIG. 9 is a screenshot of an example user interface for viewing more details associated with a search result (e.g., an object page).

FIG. 10 is a screenshot of an example user interface for managing consumption of data across computerized processes deployed in support of one or more lines of business of an organization.

DETAILED DESCRIPTION

Figure 1:
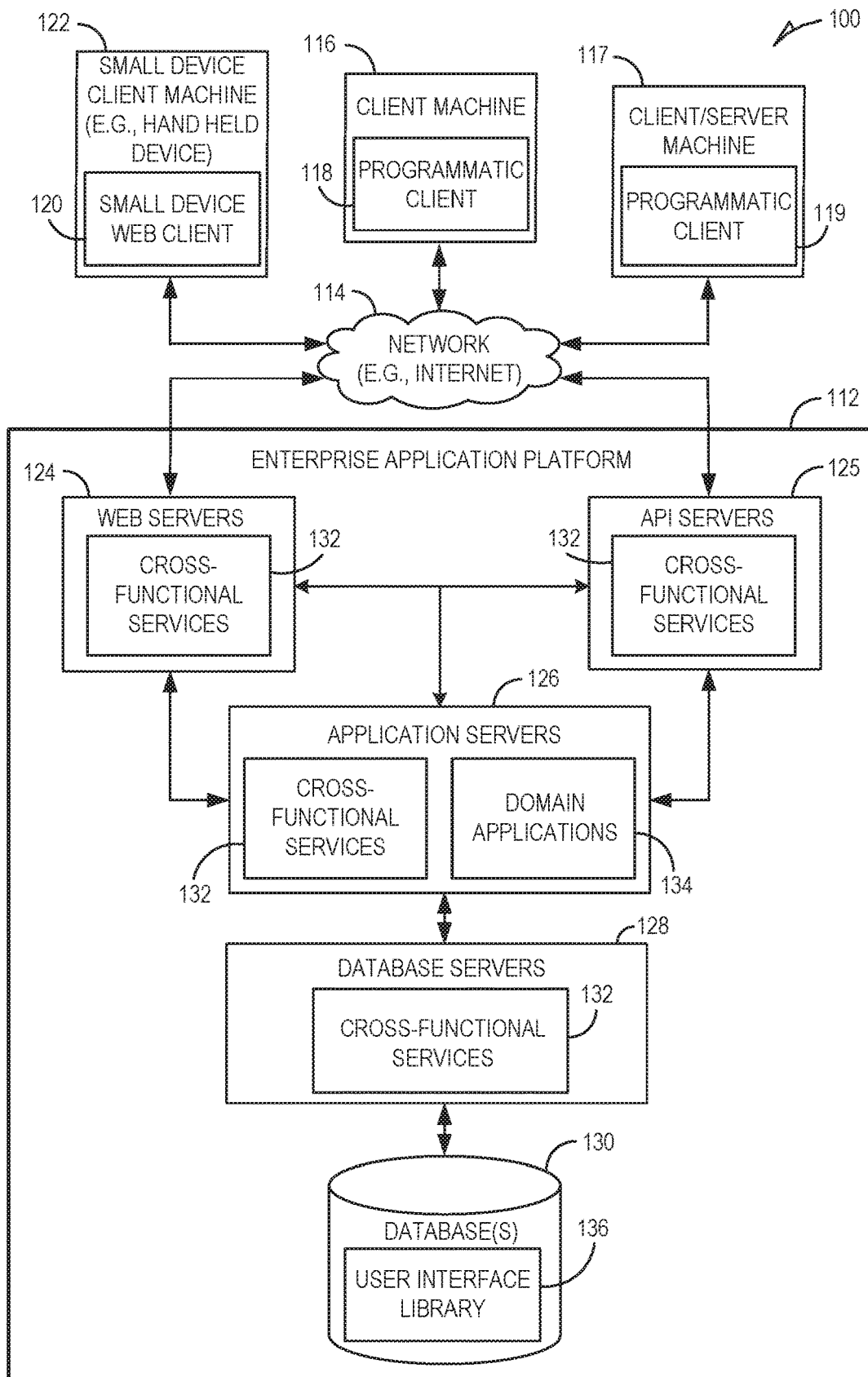
FIG. 1 is a network diagram illustrating a client-server system, in accordance with some example embodiments.

In the following description, for purposes of explanation, numerous specific details are set forth in order to provide an understanding of example embodiments of the present subject matter. It will be evident, however, to those skilled in the art that example embodiments may be practiced without these specific details.

In today's connected world, external data may be just a few clicks away from computerized processes implemented by or for any business entity. In fact, there is a large demand for any data that can be incorporated into such computerized processes to, for example, reduce the operating expenses or total cost of ownership of assets (e.g., data brokerage, processing power, memory, or bandwidth) of a business entity. For example, improved management of connections of such computerized processes to one or more external data sources may result in improved accuracy of the processes, which may, in turn, result in improved business efficiencies (e.g., with respect to a line of business (LOBs) or Information Technology (IT) department that is supported by the computerized processes).

There may be several technological hurdles to implementing data intelligence solutions or DaaS. For example, a business entity that powers its digital enterprise using a cloud platform (e.g., a Platform-as-a-Service (PaaS) model) may desire for its computerized processes to consume data items, including data items available via separate (e.g., third-party) systems, with the same flexibility that is available with on-premise solutions. Furthermore, a business entity may desire to avoid legal obstacles associated with consuming such data items, including with computerized processes supporting multiple lines of business. However, tools for turning these desires into reality are simply not available in traditional database management systems. For example, using multiple point-to-point connectors (e.g., direct connections from a data provider, such as Dun & Bradstreet or Thomson Reuters, to each of a plurality of specific applications, such as SAP S/4 HANA or SAP MDG) does not efficiently address various technological problems that arise when implementing business intelligence solutions across multiple computerized processes executing in a technological environment of a business entity or organization, including the problems discussed below.

Accessibility—Computerized processes of a business entity may identify that a particular set of data items exists, but they may not know where and how to get those data items. For example, data brokerage space may be fragmented, volatile, or disconnected. There may be a lack of understanding as to which data providers would best improve their computerized processes (e.g., with respect to their accuracy or efficient use of computing resources).

Actionality—The computerized processes may identify relevant data items, but run into various technological hurdles (e.g., with respect to finding, procuring, or consuming the data). For example, the computerized processes may discover that the data items exist in different formats, the data items are not timely, or that the computerized processes do not have the right tools to extract the data items. Or, for example, computerized processes may not have the right skills or tools to consume the data within a specific operating expense budget.

Untapped potential—The computerized processes may have accumulated a significant amount of external data over the years in different business unit or LOB applications, but do not know what to do with it. They may not have the right level of data understanding to match the data items with internal master data.

Sharing—The computerized processes may have access to relevant data items and understand the data, but they may not know how to centrally share and enable collaborative usage of the data across multiple LOB applications. For example, computerized processes associated with different LOB applications may have separate contracts with the same data vendor resulting in higher total cost of ownership (TCO) (e.g., of the data access itself or of the assets required for managing the data).

Industrializing the use of such data items, including third-party data items (e.g., for enterprise applications), may make computerized processes of business entities implementing data intelligence solutions, including cloud processes, more accurate, efficient, or economical (e.g., with respect to finding, procuring, or consuming relevant datasets in timely fashion).

In example embodiments, a method of enhancing one or more fields of a master database record based on a consumption of one or more data points provided via a third-party data subscription service is disclosed. An aggregated view corresponding to a master database record is accessed. The aggregated view corresponds to one or more search results that match a search query and identifies correspondences between the one or more fields of the master database record and the one or more data points provided via the third-party data subscription service. Based on a determination that one or more consumption criteria are met, the one or more data points are consumed using a central data enrichment system. The one or more fields of the master database record are updated based on the one or more consumed data points. The enhanced master database record to one or more computerized processes associated with one or more consumers of the enhanced master database record.

This method and example embodiments disclosed herein may be implemented by a specially-configured computer system. The computer system may be specially configured by one or more modules (e.g., hardware modules or software modules) and implemented by one or more computer processors of the computer system. This method and example embodiments disclosed herein may be embodied as instructions stored on a machine-readable medium that, when executed by one or more processors of a computer system, cause the computer system to perform one or more of the operations described herein. These operations are asserted to be non-routine or unconventional operations either individually or in combination.

The details of one or more variations of the subject matter described herein are set forth in the accompanying drawings and the description below. Other features and advantages of the subject matter described herein will be apparent from the description and drawings, and from the claims.

FIG. 1 is a network diagram illustrating a client-server system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The cross-functional services 132 can include relational database modules to provide support services for access to the database(s) 130, which includes a user interface library 136. The web servers 124, API servers 125, application servers 126, and database servers 128 can host cross-functional services 132. The application servers 126 can further host domain applications 134.

The cross-functional services 132 provide services to users and processes that utilize the enterprise application platform 112. For instance, the cross-functional services 132 can provide portal services (e.g., web services), database services and connectivity to the domain applications 134 for users that operate the client machine 116, the client/server machine 117 and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are of course not limited to such an architecture, and could equally well find application in a distributed, or peer-to-peer, architecture system.

The enterprise application platform 112 can improve (e.g., increase) accessibility of data across different environments of a computer system architecture. For example, the enterprise application platform 112 can effectively and efficiently enable a user to use real data created from use by one or more end users of a deployed instance of a software solution in a production environment when testing an instance of the software solution in the development environment. The enterprise application platform 112 is described in greater detail below in conjunction with FIGS. 2-7.

Figure 2:
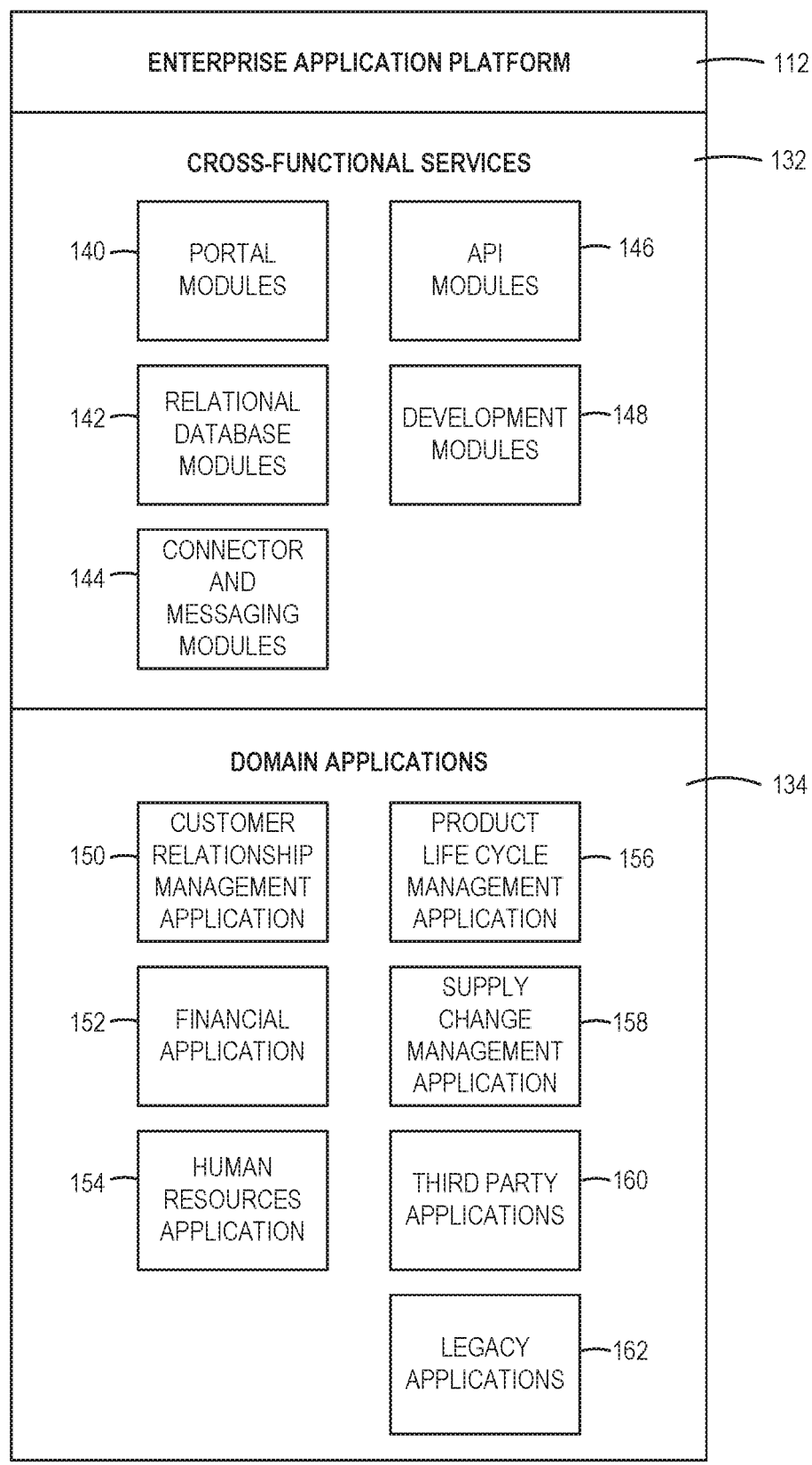
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, relational database modules 142, connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services and exchange information with other users and within a defined scope. For example, the role can determine the content that is available to the user and the activities that the user can perform. The portal modules 140 include a generation module, a communication module, a receiving module and a regenerating module. In addition, the portal modules 140 can comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft .NET.

The relational database modules 142 can provide support services for access to the database(s) 130, which includes a user interface library 136. The relational database modules 142 can provide support for object relational mapping, database independence and distributed computing. The relational database modules 142 can be utilized to add, delete, update and manage database elements. In addition, the relational database modules 142 can comply with database standards and/or utilize a variety of database technologies including SQL, SQLDBC, Oracle, My SQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating and extension of software components on the enterprise application platform 112 without impacting existing cross-functional services 132 and domain applications 134.

Turning to the domain applications 134, the customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize the financial applications 152 and business processes to track and control financial transactions within the enterprise application platform 112. The financial applications 152 can facilitate the execution of operational, analytical and collaborative tasks that are associated with financial management. Specifically, the financial applications 152 can enable the performance of tasks related to financial accountability, planning, forecasting, and managing the cost of finance.

The human resource applications 154 can be utilized by enterprise personnel and business processes to manage, deploy, and track enterprise personnel. Specifically, the human resource applications 154 can enable the analysis of human resource issues and facilitate human resource decisions based on real time information.

The product life cycle management applications 156 can enable the management of a product throughout the life cycle of the product. For example, the product life cycle management applications 156 can enable collaborative engineering, custom product development, project management, asset management and quality management among business partners.

The supply chain management applications 158 can enable monitoring of performances that are observed in supply chains. The supply chain management applications 158 can facilitate adherence to production plans and on-time delivery of products and services.

The third-party applications 160, as well as legacy applications 162, can be integrated with domain applications 134 and utilize cross-functional services 132 on the enterprise application platform 112.

Figure 3:
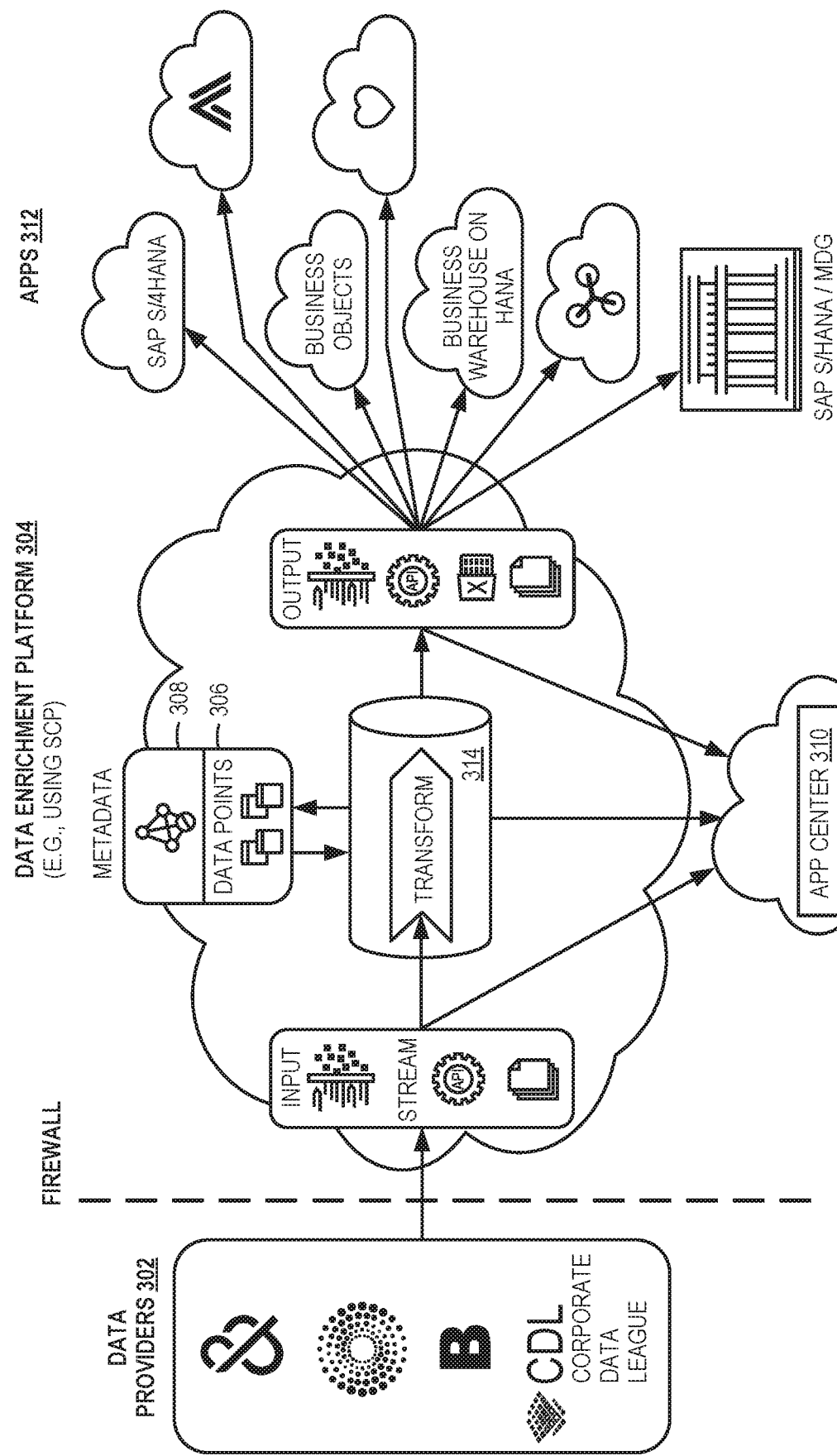
FIG. 3 is block diagram of an example architecture for implementing data intelligence solutions, including data enrichment or augmentation, in a cloud environment.

FIG. 3 is block diagram of an example architecture for implementing data intelligence solutions, including data enrichment or augmentation, in a cloud environment. In example embodiments, the goal of the architecture is to fuel data-driven enterprise applications 312 with external data (e.g., whenever and wherever they need in an intuitive subscription model or consumption model). The architecture provides direct access to external data end-to-end, supporting order-to-cash computerized processes for data procurement, while eliminating or reducing the technological problems with implementing business intelligence solutions or DaaS, as discussed above.

As shown, the architecture provides a central data enrichment platform 304 for implementing data enrichment. For example, on-demand data from one or more data providers 302 is pre-cabled with one or more applications, such as SAP S/4 HANA, SAP S4/HANA Master Data Governance (MDG), or non-SAP applications. Thus, data setup and integration costs are mitigated or eliminated. Data is organized as data points 306. Each of these data points can be sourced from one or more different data vendors. The platform centrally links external data providers into enterprise cloud or on-premise applications, which reduces overall TCO for data brokerage needs.

The platform provides global coverage (e.g., across multiple domains, industries, or geographies). The platform provides external data (e.g., in a reseller business model), from major data providers 302, providing a one-stop shop for multiple data augmentation needs.

The platform provides external data in one or more particular contexts. For example, the platform may associate external data with in-house master data for presentation within a particular application. For example, a harmonized view may be provided (e.g., presented in a user interface of a particular application). The harmonized view may show relationships between data items accessed from multiple external data sources as well as master data items of a business entity.

The architecture provides for collaboration. For example, the architecture provides tools for users to provide closed-loop feedback on consumed data (e.g., with respect of the quality of the data). The closed-loop feedback system may thus improve the trust level of consumed external data. The feedback may be optionally shared with the data vendor (e.g., as a DaaS plan to which the provider of the external data could subscribe).

In example embodiments, the architecture is a pure cloud solution built on a cloud platform (e.g., SAP Cloud Platform (SCP)). The architectural style may be based on the micro services methodology. At least some of the external data (e.g., less frequently-changed data) may be persisted inside the cloud platform (e.g., in a central database 314). Other external data (e.g., highly-volatile data, like credit score, risk score, or stock process data) may be fetched in real-time form one or more data providers. In example embodiments, each type of external data (e.g., highly-volatile or less-volatile) may be handled by a different microservice of a plurality of microservices 308. The data may then be transformed (e.g., from a data format supported by the data providers 302 into a data format supported by one or more of the application 312) and passed onto the consumers (e.g., using additional microservices of the plurality of microservices 308). The platform may thus offer availability of business intelligence solutions or DaaS for any enterprise application. Certain applications may include pre-wired integration, including harmonized relationship views (e.g., within user interfaces of the applications) of the data items, whether they are external data items, master data items, or both. In example embodiments, an application center 310 (e.g., SAP App Center) may be used as a sales channel in an agent-based business model.

Figure 4:
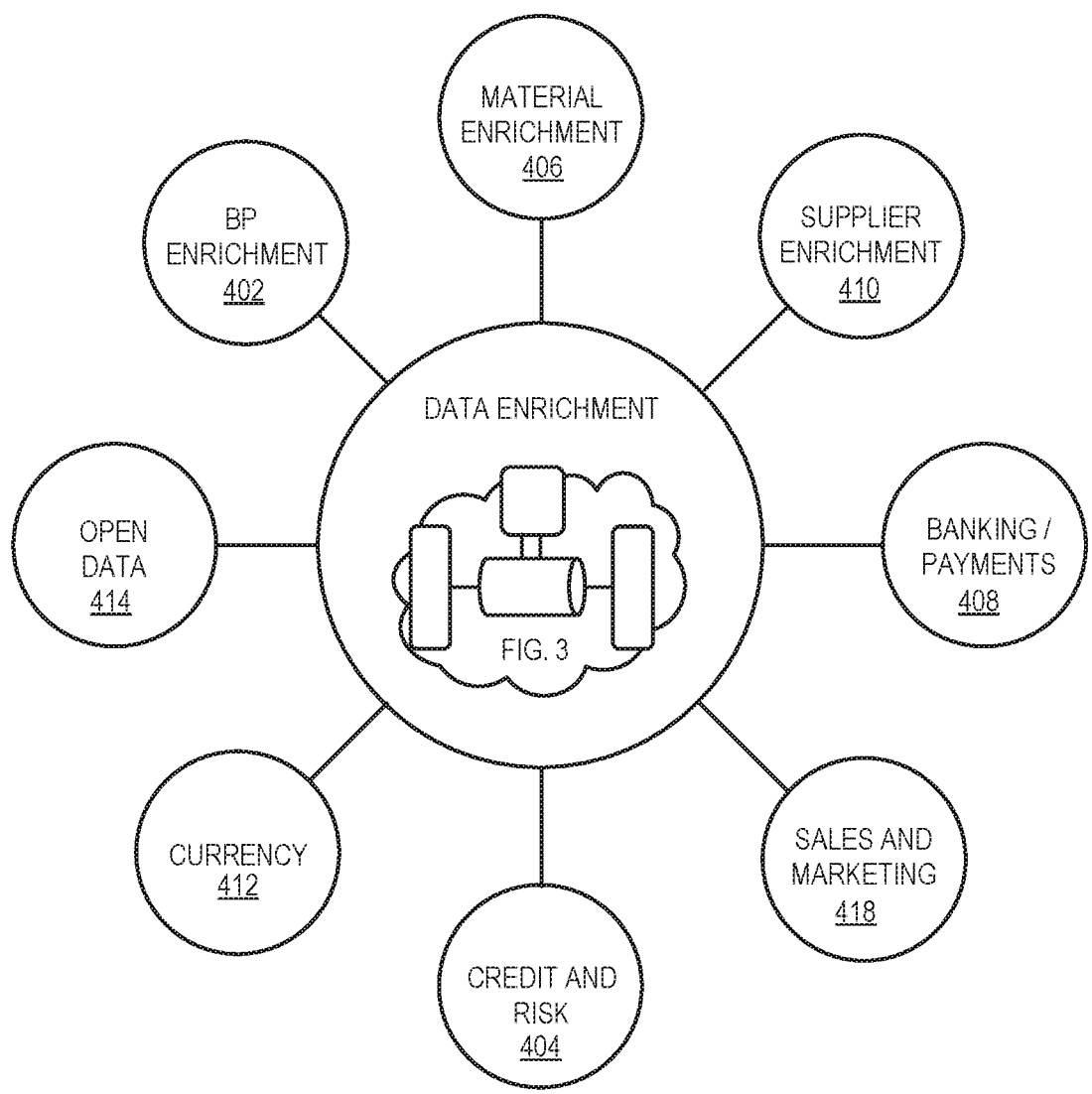
FIG. 4 is a block diagram of dataset categories or domains for which data enrichment is enabled (e.g., by the example architecture of FIG. 3).

FIG. 4 is a block diagram of dataset categories or domains for which data enrichment is enabled (e.g., by the example architecture of FIG. 3). Business Partner ("BP") enrichment 402 may be used to enhance applications for automating business partner creation, improving operational efficiency of computerized processes relating to managing business partnerships, enriching database records of new or existing business partners, or providing harmonized views of business partnership data. Example data providers may include Dun & Bradstreet (D&B) or Thompson Reuters. Example data sets may include corporate hierarchy data items, corporate linkage data items, or business partner data items, such as firmographic, credit, risk, or Paydex data items. Example consumers may include database systems, enterprise resource planning (ERP) systems, or business suite or computing platforms, such as SAP S/4 HANA, or data management solutions, such as SAP S/4 HANA MDG.

Risk & Credit enrichment 404 may be used to enhance applications for automating a risk or credit decision making process, due diligence in deal making, prioritizing collections, verifying identities of companies or individuals, validating shareholders, establishing beneficial ownership, screening across sanctions or watch lists, or identifying a politically exposed person (PEP). Example data sets may include viability ratings, D&B ratings, payments and Paydex scores, corporate linkage data, financial statements, legal status data (suits, liens, judgments, or bankruptcy), detailed company profiles, small business risk insights, predictive bankruptcy and payment risk data, and adverse media, litigation, or open source research. Example data providers may include Thomson Reuters, D&B, Accuity, or Mandell. Example consumers may include database systems, ERP systems, or business suite or computing platforms, such as SAP S/4 HANA, or financial applications or compliance applications, such as SAP Governance, Risk, and Compliance (GRC).

Material data enrichment 406 may be used to enhance applications for automating material creation or improving operational efficiency (e.g., by providing more accurate spend analysis based on improved master data or records). Such improvement may be with respect to, for example, completion, standardization, accuracy, or quality of the underlying data used by the applications. Example data sets may include material short description, material long descriptions, or templates for specific classes with characteristic values. Example data providers may include Pilog. Example consumers may include database systems, ERP systems, or business suite or computing platforms, such as SAP S/4 HANA, or data management solutions, such as SAP S/4 HANA MDG.

Compliance data enrichment 408 may be used to enhance applications for automating anti-corruption compliance processes, shifting reliance from self-disclosed information to third-party confirmed data, or supporting adherence to regulatory burdens to verify regulations (e.g., Foreign Corrupt Practices Act of 1977 (FCPA), Anti-Bribery & Anti-Corruption (ABAC), Anti-Money Laundering (AML), or customer due diligence (e.g., FinCEN) requirements. Example data sets may include diversity data or money laundering, terrorism financing, bribery, forced labor, or other corruption data feeds. Example data providers may include D&B, Thomson-Reuters, or Accuity). Example consumers may include database systems, ERP systems, or business suite or computing platforms, such as SAP S/4 HANA, business partner screening or compliance solutions, such as SAP GRC.

Supplier data enrichment 410 may be used to enhance applications for analyzing supplier performance, regulatory compliance, source-cost optimization, or order management optimization. Example data sets may include viability ratings, payments or Paydex scores, corporate linkage data, legal status data (e.g., suits, liens, judgements, or bankruptcy data), detailed company profiles, predictive bankruptcy and payment risk data, country risk data, corporation type data, or corporation ownership data. Example data providers may include D&B. Example consumers may include database systems, ERP systems, or business suite or computing platforms, such as SAP S/4 HANA.

Currency data may enrichment 412 may be used to enhance applications for reconciling foreign currency amounts (e.g., when posting, clearing, or checking amounts), gain or loss analysis based on exchange rates (d/f), or analyzing business data in multiple currencies. Example data sets may include currency exchange rates. Example data providers may include Thomson-Reuters. Example consumers may include database systems, ERP systems, or business suite or computing platforms, such as SAP S/4 HANA, or finance, treasury, procurement, or human resources applications.

Open data enrichment 414 may be used to enhance applications that use data from open data platforms, including household income applications, building permit applications (e.g., building permits issued in a zip code), economic indicator applications (e.g., GDP, inflation, and so on), economic statistic applications (e.g., building permit, household income, income, or job-related data), weather applications, or industry benchmark applications. Example data may include providers of census data, OECD data, Eurostat data, World Bank data, BLS data, Data.gov data, Accuweather data, and so on. Example consumers may include database systems, ERP systems, or business suite or computing platforms, such as SAP S/4 HANA.

Prediction and machine-learning enrichment may be used to enhance applications for identifying global business prospects, discovering high-value look-like prospects, generating customer retention insights (e.g., chum analysis), identifying most valuable customers, accessing growth potential, or improving account and prospect segmentation. Example data sets may include firmographics, number of employees, annual sales, corporate hierarchy and linkage, customer behavior (e.g., cross-border inquiries, contracts, country risk report purchases, etc.), weather and economic data, stock prices, news feeds, financial ratios, and so on. Example data providers may include Thomson-Reuters, D&B open datasets, historical data sets, and current data sets. Example consumers may include artificial intelligence or machine-learning applications, such as SAP Clea. or business intelligence applications, such as SAP BusinessObjects Cloud.

Sales and marketing enrichment 418 may be used to enhance applications for territory management, buyer/influencer mapping, segmentation, targeting, or social/digital intelligence. Example data sets may include firmographics, DUNS, contact names, titles, email addresses, phone numbers, or web visitor ID profile attributes. Example data providers may include D&B or Thomson-Reuters. Example consumers may include customer relationship management (CRM) applications, such as SAP Cloud for Customer (C4C).

As discussed above, each data provider or each data point may be associated with a one or more microservices at the architectural level. Consumers may then access particular data points within each of the datasets using the corresponding microservices. This use of microservices can contribute to a reduction in TCO associated with accessing data across different or separate computer processes deployed within different or separate lines of business of an organization, including computerized processes associated with any combination of the example applications discussed above. In other words, the use of microservices is one aspect of the disclosed architecture that leads to more optimal use of processor power, memory, or bandwidth resources for data brokerage needs of an organization. Additionally, as discussed herein, the central deployment of the microservices is another aspect that contributes to such optimizations (e.g., through the elimination of one-to-many provider-to-consumer model).

Figure 5:
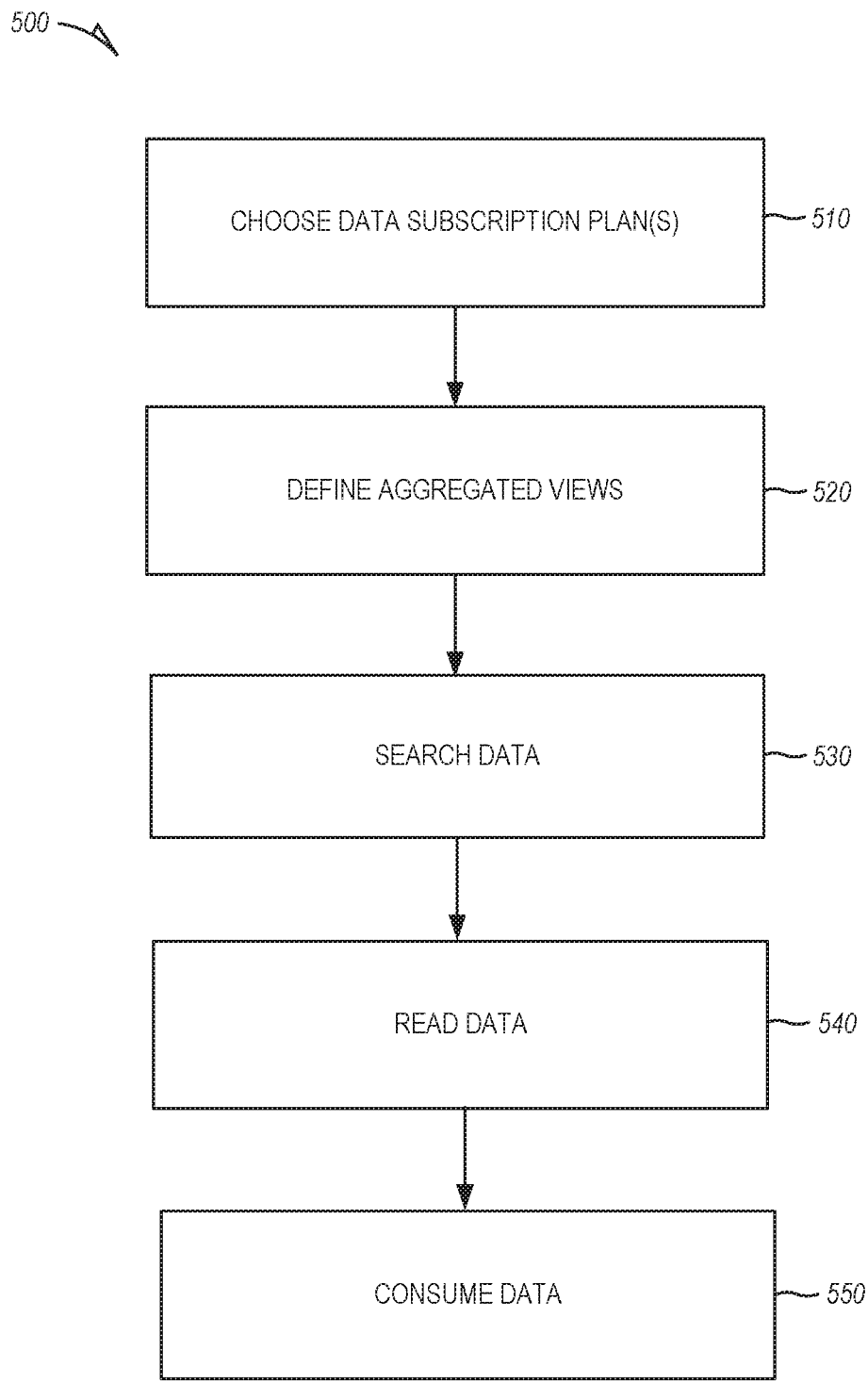
FIG. 5 is an example method of enriching existing master data by consuming data from data providers.

FIG. 5 is an example method 500 of enriching existing master data by consuming data from data providers. In example embodiments, this data enrichment process enables consumers to eliminate the risk of errors in manual data creation as well as reduce TCO as discussed herein. In example embodiments, operations of example method 500 are performed by a centralized data enrichment platform (e.g., see the data enrichment platform 304).

At operation 510, after enabling the data enrichment platform or system (e.g., as depicted in FIG. 3), an administrator chooses one or more data subscription plans provided by third-party data providers. A front-end user interface may be generated and presented to the administrator to serve as a central location for searching for and identifying third-party providers that provide data sets or data points that match consumers, including applications, that are detected to be deployed in a particular customer environment. These third-party data providers may enable access to their data through business intelligence solutions or DaaS. The front-end system may detect publication of third-party data for access (e.g., by subscription), which is then made accessible to the administrator (e.g., through browsing or searching capabilities and associated front-end administrative user interfaces). Available data items that are particularly relevant to the customer's detected environment may be highlighted or otherwise promoted within the front-end administrative user interface to assist the operator in identifying likely candidates for subscription. The determination of particularly relevant data sets or data items may be based on associations identified by the third-party providers or machine-learning of associations based on customer environments similar to the one in which the administrative user interface is invoked.

At operation 520, an administrator defines aggregated views corresponding to the one or more selected third-party data subscriptions. For example, an Aggregated View application or user interface may be invoked by an administrator. The user interface may enable the administrator to define data views that may serve as templates for query and consumption of one or more data points in one or more data sets. In each aggregated view, the administrator may choose or specify one or more data points from one or more data sets provided by one or more providers, such as one or more of the data points discussed above with respect to FIG. 4.

At operation 530, a user may perform a search of identified available third-party data (e.g., from a pre-wired or pre-configured user interface of a consuming application or system, such as SAP S/4 HANA Cloud). When the user performs the search, specifying one or more search criteria, a data enrichment search service may be invoked (e.g., with respect to an aggregated view), which in turn calls one or more APIs to retrieve records corresponding to the search query submitted by the user. As explained above, the APIs may each be associated with one or more microservices, which, in turn, may implement specialized data retrieval corresponding to one or more combinations of data types, data points, data sets, data providers, and data consumers and/or transformations of retrieved data to output formats supported by one or more deployed consuming applications. The search service may perform a fault-tolerant search using the search query specified by the user and the search results may then be presented in a supplemental, pre-configured, or pre-wired user interface of the consuming application. In example embodiments, each data point included in the search results is associated with a search score that quantifies its relevance to the search query. In example embodiments, each data point is also associated with a match threshold score that quantifies its predicted accuracy (e.g., based on the feedback loop discussed above). For example, the match threshold may specify a percentage confidence, such as a machine-learned percentage of confidence, as well as a pre-configured or pre-defined plain language definition corresponding to the percentage confidence (e.g., "Very Fuzzy" (60%)).

At operation 540, a user may read one or more data items corresponding to one or more results of the search query (e.g., using the aggregate view). In example embodiments, for each data item, a data enrichment read service may be invoked (e.g., with respect to the aggregated view), which, in turn calls one or more APIs to read records corresponding to a data item. The reading of the data may include reading different types of data in different ways. For example, as discussed above, certain data items (e.g., non-volatile data items that have been previously consumed by a consumer application) may be stored in a central database and accessed from the central database without requiring an additional reading of the data from a third-party service. Sharing data previously consumed across different processes associated with different consumers deployed in support of different lines of business is one of the aspects of the system which may reduce TCO or otherwise optimize usage of assets, including at least one of processing power, memory, or bandwidth. In example embodiments, even for volatile data items, metadata associated with each data point may specify conditions or thresholds under which reading or consumption of third-party data items is allowed or required to support computerized processes of various consumers deployed across an organization. Such conditions or thresholds may take into account costs of data acquisition according to the various subscription models as well as budget allocated for data acquisition.

The reading of the data items may allow the user or consuming system to subsequently consume the data (e.g., create or update master data that supports one or more consuming systems).

At operation 550, read data may be consumed by one or more computerized processes of one or more consuming systems. In this way, quality metrics associated with one or more sets of master data (e.g., accuracy) may be improved. This improvement of one or more sets of master data may be another aspect of the centralized data enrichment system that improves TCO and optimizes asset utilization of computerized processes associated with various consumers of an organization. In example embodiments, data consumption occurs when data is actually accessed and read from a third-party according to the terms of one or more data subscriptions (e.g., as selected by an administrator) and/or when one or more master data records are updated based on the accessing or reading of one or more third-party data items. In example embodiments, a Data Consumption application allows an administrator to specify conditions and thresholds under which data consumption is allowed (e.g., for particular data consumers, across computerized processes of various data consumers, or across lines of business). Thus, an administrator may create or tweak various parameters of the data enrichment system to keep data consumption requirements of an organization within budgetary constraints of the organization or lines of business within the organization.

Figure 6:
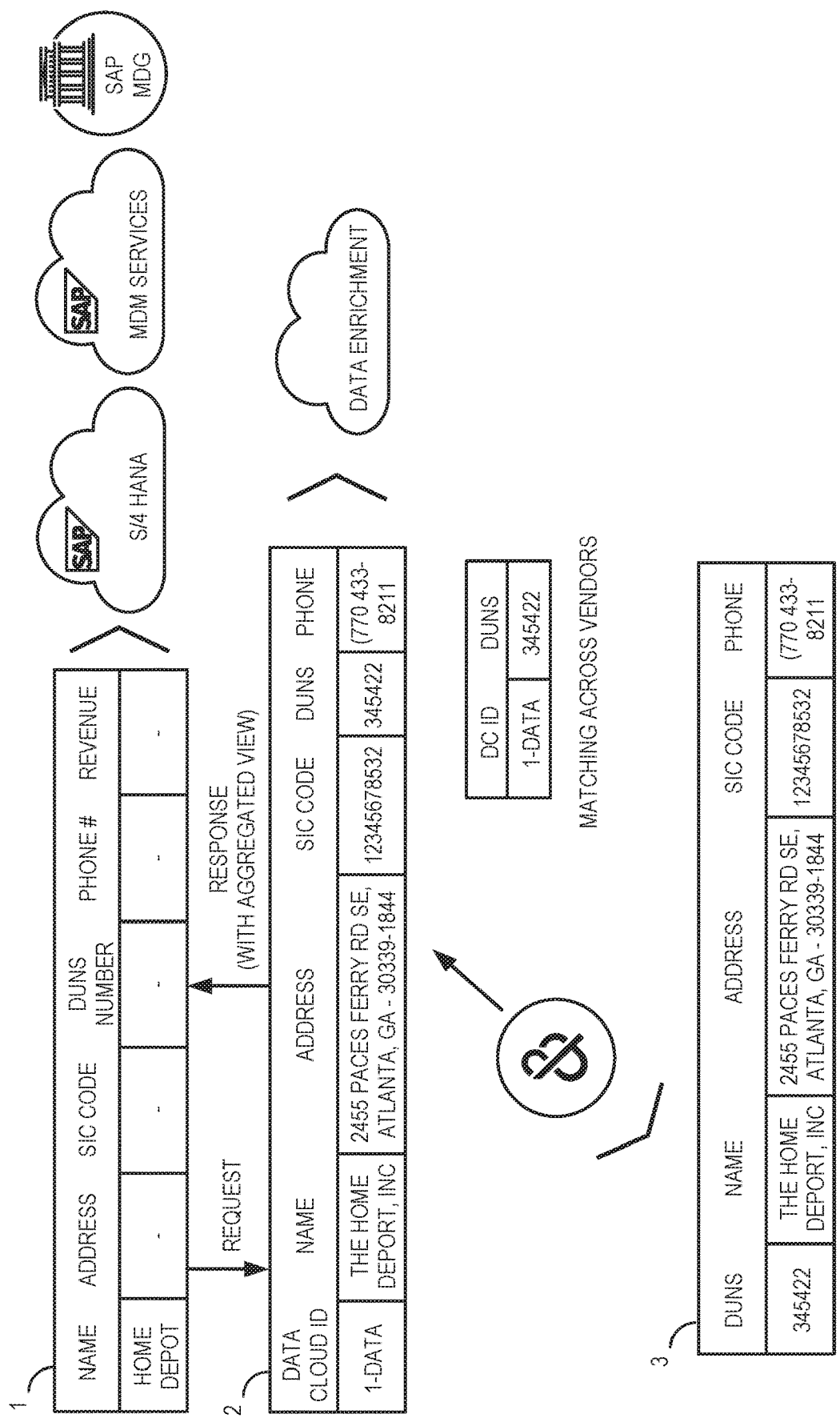
FIG. 6 is a block diagram depicting an example business partner data enrichment use case.

FIG. 6 is a block diagram depicting an example business partner data enrichment use case. In example embodiments, the example operations are performed in real-time or in batch mode (e.g., depending on administrative policies, such as those specified by an administrator via an administrative user interface) to enrich master data records corresponding to business partner data. At operation 1, an administrator (e.g., a data steward) enters a search criteria to search for a business partner having one or more attributes (e.g., the administrator enters the name of the business partner, such as "Home Depot").

At operation 2, the submitted search request triggers identification of one or more matching records in the master data corresponding to the search criteria. Additionally, one or more fields in the matching records are enriched with one or more values based on one or more aggregated views. The one or more records may each be associated with a data cloud ID (e.g., "1-DATA"). Additionally, one or more third-party data vendors or providers (e.g., as selected from the subscription plans of the organization) may be associated with each data cloud ID. A depiction of data available from the one or more third-party vendors to supplement the master data may be presented in a user interface of the data enrichment system or in a pre-wired or pre-configured user interface of a consuming application, allowing an administrator to visualize data that is available to supplement or improve upon the master data.

At operation 3, a decision may then be made (e.g., manually by an administrator or automatically by computerized processes associated with one or more data consumer systems) to consume the data and thus improve the quality of the master data. In example embodiments, automated consumption of the data is done according to conditions and thresholds set to optimize master data quality within specified budget constraints of the organization.

FIG. 7 is a screenshot of an example user interface for creating or editing an aggregated view. The aggregated view is defined by a template ("BPViewTemplate") and includes one or more data points associated with a business partner (BP) domain. Here, the data points include mailing address, standard address, business partner data, industry sector data, and trade style data. As indicated, the data points are associated with metadata pertaining to accessing, reading, and consuming the data points from a particular data provider (e.g., the D&B data provider) (e.g., based on a subscription to a data plan of the data provider) and made accessible to a particular product (e.g., "SAP-Core"). The user interface includes one or more user interface elements (e.g., Add, Edit, and Delete buttons) that allow an administrator to modify the data points or metadata associated with the data points, as well as to modify the template itself or metadata associated with the template, such as the name of the template, a description of the template, and a data domain with which the template is associated (e.g., "Edit Header" and "Delete" buttons). In example embodiments, an aggregated view is associated with a match threshold value, which may be associated with a feedback loop defining match threshold data of the data points included in the template, as described herein).

Figure 8:
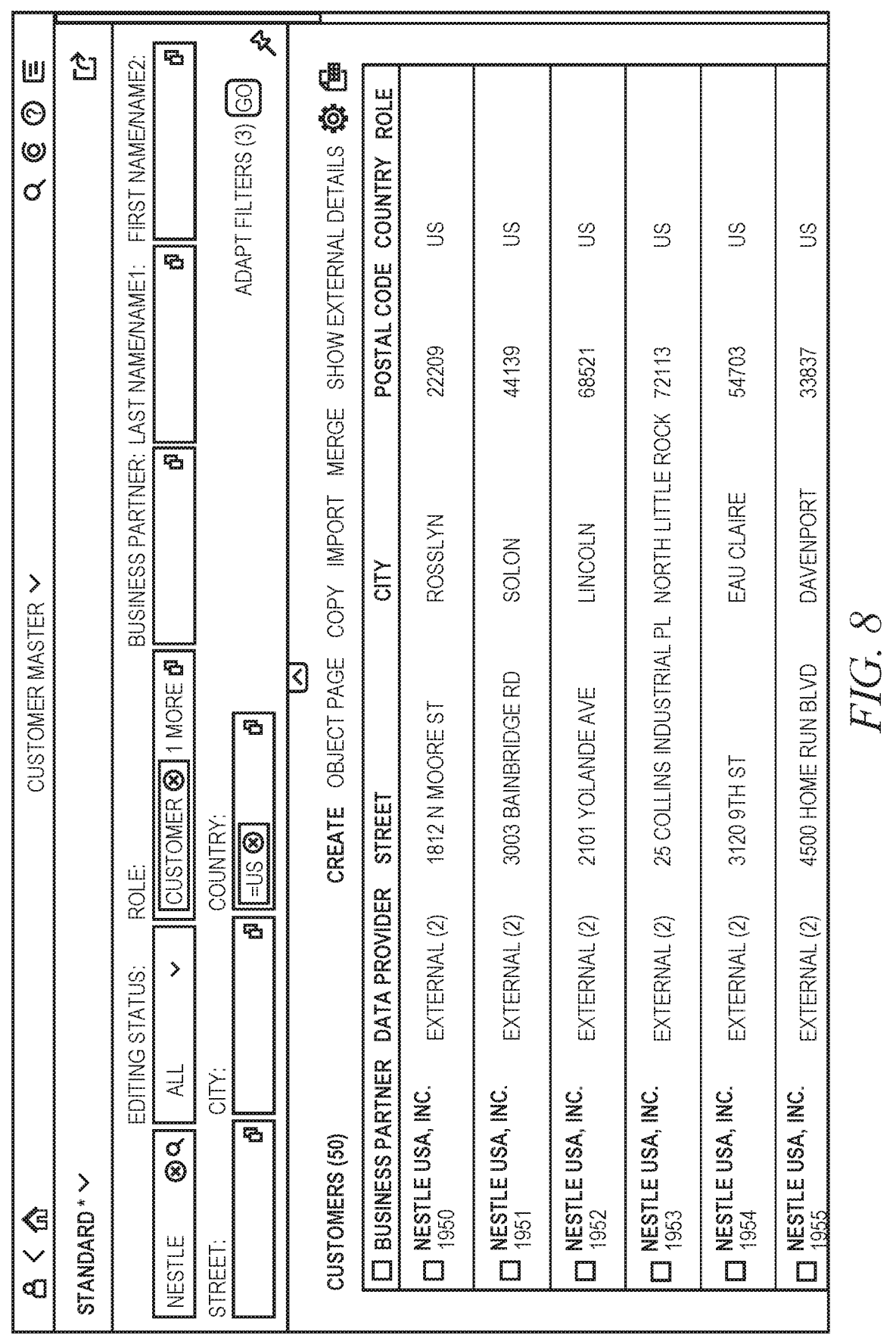

FIG. 8 is screenshot of an example user interface for querying one or more master data sets. In example embodiments, the query user interface may be a standalone user interface presented by the data enrichment system or a user interface that is pre-configured or pre-wired into particular data consumers deployed within an environment of a business organization. As depicted, a search specifying a business partner name (e.g., "Nestle") may yield one or more matches to one or more master data records. Each of the master data records may, in turn, be linked to one or more external data providers (e.g., via an aggregated view). The query user interface may allow an administrator to select one or more results and perform various options on the results to improve the quality of the master data. For example, the administrator may create, copy, import, or merge master data records (e.g., see the Create, Copy, Import, and merge buttons). Additionally, the administrator may view an object page or show external details associated with a search results (see the Object Page and Show External Details buttons). Thus, an administrator may be presented with conflicting data from one or more data providers and use tools of the user interface to resolve any discrepancies with respect to the master data records.

FIG. 9 is a screenshot of an example user interface for viewing more details associated with a search result (e.g., an object page). Here, all of the data read or consumed from a particular third-party provider (e.g., D&B) pertaining to the search result is organized and presented to an administrator such that the administrator may take an appropriate action with respect to the record (e.g., by incorporating one or more data points into an aggregated view). Here, basic data associated with the search result is presented, including the business partner name, provider ID, business partner ID, legal status, national ID number, National ID Type, Subsidiary indicator, Family Tree Hierarchy level Code, Registered Address ID, Website Address Domain, and Website Address URL. Additional data, including business data, address data, and hierarchy data may also be accessible (e.g., by clicking on tab-like user interface elements associated with the corresponding data sets). A standard address for the company, organization status of the company, and contact information for the company may also be presented in the user interface. As indicated in the header of the user interface, the object page associated with this search result falls under the Business Partner domain, but the object page may also be associated with other data domains (e.g., as accessible from a drop-down user interface element in the header).

FIG. 10 is a screenshot of an example user interface for managing consumption of data across computerized processes deployed in support of one or more lines of business of an organization. As shown, records are created for each data point or data set that is accessed from a third-party source (e.g., based on one or more selected subscription plans). Here, the business partner ID associated with each record, the aggregated view, the provider ID, and the date of access is shown. A user interface element (e.g., a setting element) may allow an administrator to set one or more criterion or thresholds for data access. Thus, an administrator may limit third-party data access across computerized processes associated with different lines of businesses of the organization (e.g., according to budgetary or other constraints).

EXAMPLES

1. A method comprising:

accessing, using one or more computer processors of a data enrichment platform, an aggregated view corresponding to a master database record and corresponding to one or more search results that match a search query, the aggregated view identifying correspondences between the one or more fields of the master database record and one or more data points provided via the third-party data subscription service;

based on a determination that one or more consumption criteria are met, consuming, using the one or more computer processors, the one or more data points, the consuming including requesting the one or more data points from a third-party data subscription service and storing the one or more data points in a central database:

enhancing, using the one or more computer processors, the one or more fields of the master database record based on the one or more consumed and stored data points; and providing, using the one or more computer processors, the enhanced master database record via a network to one or more computerized processes associated with one or more consumers of the enhanced master database record.

2. The method of example 1, wherein the providing of the enhanced master database record includes determining that none of the one or more fields includes volatile data for which an updating threshold has been met.

3. The method of example 1 or example 2, wherein the providing of the enhanced master database record occurs after an updating of at least one of the one or more fields based on an identification that the one or more fields includes volatile data for which an updating time threshold has been met.

4. The method of examples 1-3, wherein the updating includes an additional consumption of the one of the at least one of the one or more fields.

5. The method of examples 1-4, wherein the computerized processes associated with the one or more consumers of the enhanced database record are distributed across computer systems associated with multiple lines of business of an organization.

6. The method of examples 1-5, wherein the one or more consumption criteria include that a data brokerage budget associated with each of the lines of business has not been exceeded.

7. The method of examples 1-6, wherein the enhancing of the central database is shared among the one or more computerized processes such that a subsequent access of the aggregated view does not trigger an additional consuming of the one or more data points.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In example embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 102) and via one or more appropriate interfaces (e.g., APIs).

Example embodiments may be implemented in digital electronic circuitry, or in computer hardware, firmware, or software, or in combinations of them. Example embodiments may be implemented using a computer program product (e.g., a computer program tangibly embodied in an information carrier, in a machine-readable medium for execution by, or to control the operation of, data processing apparatus, such as a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Figure 11:
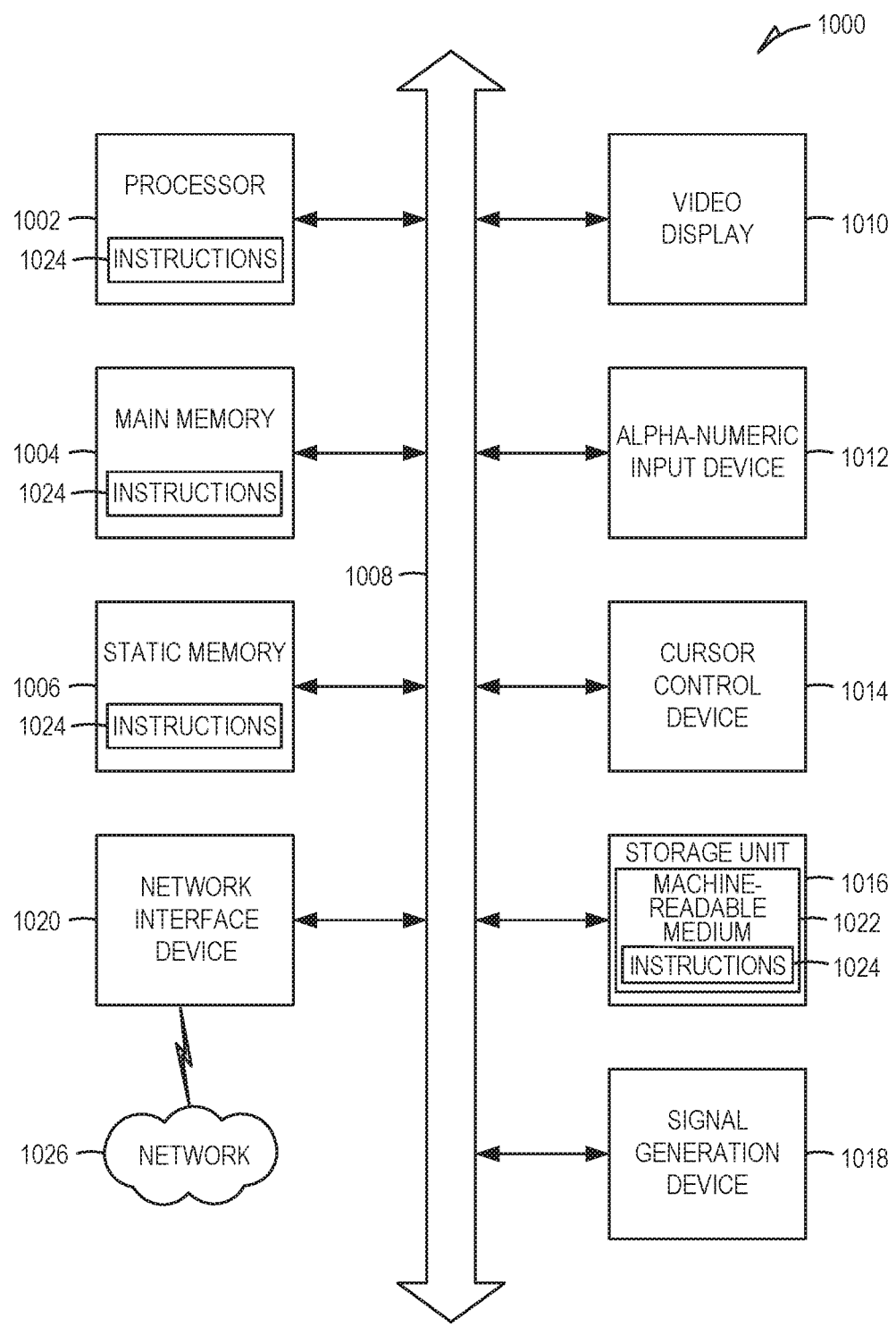
FIG. 11 is a block diagram of a machine in the example form of a computer system within which instructions for causing the machine to perform any one or more of the operations or methodologies discussed herein may be executed.

FIG. 11 is a block diagram of machine in the example form of a computer system 1000 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a mobile phone (e.g., an iPhone or a mobile phone executing an Android operating system), a web appliance, a network router, a network switch or a network bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 (e.g., a mouse), a storage unit 1016 (e.g., a disk drive unit), a signal generation device 1018 (e.g., a speaker), and a network interface device 1020.

The storage unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 or within the processor 1002 during execution thereof by the computer system 1000, the main memory 1004 and the processor 1002 also constituting machine-readable media. The instructions 1024 may also reside, completely or at least partially, within the static memory 1006.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding, or carrying data structures utilized by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 1024 may further be transmitted or received over a communications network 1026 using a transmission medium. The instructions 1024 may be transmitted using the network interface device 1020 and any one of a number of well-known transfer protocols (e.g., hypertext transfer protocol (HTTP)). Examples of communication networks include LANs, WANs, the Internet, mobile telephone networks, plain old telephone service (POTS) networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 1026 may be one of the networks 102.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of example embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of example embodiments. Combinations of the above embodiments, and other embodiments not specifically described herein, will be apparent to those of skill in the art upon reviewing the above description.

What is claimed is:

1. A system comprising:
   one or more computer processors;
   one or more computer memories; and
   a set of instructions incorporated into the one or more computer memories of a data enrichment platform, the set of instructions configuring the one or more computer processors of the data enrichment platform to perform operations for enhancing one or more fields of a master database record based on a consumption of one or more data points provided via a third-party data subscription service, the operations comprising:
   accessing, by the one or more computer processors, an aggregated view corresponding to a master database record stored in a central database and corresponding to one or more search results that match a search query, the aggregated view identifying correspondences between the one or more fields of the master database record and the one or more data points provided via the third-party data subscription service;
   based on a determination that one or more consumption criteria are met, consuming, by the one or more computer processors, the one or more data points, the consuming including requesting the one or more data points from the third-party data subscription service and storing the one or more data points in the central database;
   enhancing, by the one or more computer processors, the one or more fields of the master database record based on the one or more consumed and stored data points; and
   providing, by the one or more computer processors, the enhanced master database record via a network to one or more computerized processes associated with one or more consumers of the enhanced master database record.

2. The system of claim 1, wherein the providing of the enhanced master database record includes determining that none of the one or more fields includes volatile data for which an updating threshold has been met.

3. The system of claim 1, wherein the providing of the enhanced master database record occurs after an updating of at least one of the one or more fields based on an identification that the one or more fields includes volatile data for which an updating time threshold has been met.

4. The system of claim 3, wherein the updating includes an additional consumption of the one of the at least one of the one or more fields.

5. The system of claim 1, wherein the computerized processes associated with the one or more consumers of the enhanced database record are distributed across computer systems associated with multiple lines of business of an organization.

6. The system of claim 5, wherein the one or more consumption criteria include that a data brokerage budget associated with each of the lines of business has not been exceeded.

7. The system of claim 1, wherein the enhancing of the central database is shared among the one or more computerized processes such that a subsequent access of the aggregated view does not trigger an additional consuming of the one or more data points.

8. A method comprising:
   accessing, using one or more computer processors of a data enrichment platform, an aggregated view corresponding to a master database record and corresponding to one or more search results that match a search query, the aggregated view identifying correspondences between the one or more fields of the master database record and one or more data points provided via the third-party data subscription service;
   based on a determination that one or more consumption criteria are met, consuming, using the one or more computer processors, the one or more data points, the consuming including requesting the one or more data points from a third-party data subscription service and storing the one or more data points in a central database;

enhancing, using the one or more computer processors, the one or more fields of the master database record based on the one or more consumed and stored data points; and providing, using the one or more computer processors, the enhanced master database record via a network to one or more computerized processes associated with one or more consumers of the enhanced master database record.

9. The method of claim 8, wherein the providing of the enhanced master database record includes determining that none of the one or more fields includes volatile data for which an updating threshold has been met.

10. The method of claim 8, wherein the providing of the enhanced master database record occurs after an updating of at least one of the one or more fields based on an identification that the one or more fields includes volatile data for which an updating time threshold has been met.

11. The method of claim 10, wherein the updating includes an additional consumption of the one of the at least one of the one or more fields.

12. The method of claim 8, wherein the computerized processes associated with the one or more consumers of the enhanced database record are distributed across computer systems associated with multiple lines of business of an organization.

13. The method of claim 12, wherein the one or more consumption criteria include that a data brokerage budget associated with each of the lines of business has not been exceeded.

14. The method of claim 8, wherein the enhancing of the central database is shared among the one or more computerized processes such that a subsequent access of the aggregated view does not trigger an additional consuming of the one or more data points.

15. A non-transitory machine-readable medium storing instructions that, when executed by one or more computer processors, cause the one or more computer processors to perform operations for enhancing one or more fields of a master database record based on a consumption of one or more data points provided via a third-party data subscription service, the operations comprising:

accessing an aggregated view corresponding to a master database record stored in a central database and corresponding to one or more search results that match a search query, the aggregated view identifying correspondences between the one or more fields of the master database record and the one or more data points provided via the third-party data subscription service;

based on a determination that one or more consumption criteria are met, consuming the one or more data points, the consuming including requesting the one or more data points from the third-party data subscription service and storing the one or more data points in the central database;

enhancing the one or more fields of the master database record based on the one or more consumed and stored data points; and providing the enhanced master database record via a network to one or more computerized processes associated with one or more consumers of the enhanced master database record.

16. The non-transitory machine-readable medium of claim 15, wherein the providing of the enhanced master database record includes determining that none of the one or more fields includes volatile data for which an updating threshold has been met.

17. The non-transitory machine-readable medium of claim 15, wherein the providing of the enhanced master database record occurs after an updating of at least one of the one or more fields based on an identification that the one or more fields includes volatile data for which an updating time threshold has been met.

18. The non-transitory machine-readable medium of claim 17, wherein the updating includes an additional consumption of the one of the at least one of the one or more fields.

19. The non-transitory machine-readable medium of claim 15, wherein the computerized processes associated with the one or more consumers of the enhanced database record are distributed across computer systems associated with multiple lines of business of an organization.

20. The non-transitory machine-readable medium of claim 19, wherein the one or more consumption criteria include that a data brokerage budget associated with each of the lines of business has not been exceeded.

* * * * *